(12) United States Patent
Oota

(10) Patent No.: US 10,642,674 B2
(45) Date of Patent: May 5, 2020

(54) STORAGE CONTROL DEVICE WITH POWER FAILURE PROCESSING AND ABNORMALITY PROCESSING

(71) Applicant: FUJITSU LIMITED, Kawasaki-shi, Kanagawa (JP)

(72) Inventor: Yuusuke Oota, Hiratsuka (JP)

(73) Assignee: FUJITSU LIMITED, Kawasaki (JP)

( * ) Notice: Subject to any disclaimer, the term of this patent is extended or adjusted under 35 U.S.C. 154(b) by 213 days.

(21) Appl. No.: 15/885,950

(22) Filed: Feb. 1, 2018

(65) Prior Publication Data

US 2018/0232307 A1 Aug. 16, 2018

(30) Foreign Application Priority Data

Feb. 10, 2017 (JP) ................. 2017-022722

(51) Int. Cl.

| G06F 11/07 | (2006.01) |
|---|---|
| G06F 1/30 | (2006.01) |
| G06F 11/14 | (2006.01) |
| G06F 12/0804 | (2016.01) |
| G06F 11/20 | (2006.01) |
| G06F 11/30 | (2006.01) |

(52) U.S. Cl.
CPC .......... *G06F 11/0778* (2013.01); *G06F 1/30* (2013.01); *G06F 11/073* (2013.01); *G06F 11/1471* (2013.01); *G06F 11/2015* (2013.01); *G06F 11/3058* (2013.01); *G06F 12/0804* (2013.01)

(58) Field of Classification Search
CPC ............... G06F 11/073; G06F 11/0766; G06F 11/0778; G06F 11/787; G06F 11/1402; G06F 11/1441; G06F 11/1471; G06F 11/1666; G06F 11/2015; G06F 11/3037; G06F 11/3058; G06F 12/0804; G06F 1/30
See application file for complete search history.

(56) References Cited

U.S. PATENT DOCUMENTS

| 6,513,097 B1 * | 1/2003 | Beardsley ........... G06F 11/0724 |
| | | 711/113 |
| 9,703,346 B2 * | 7/2017 | Mudusuru ................ G06F 1/30 |
| 9,830,257 B1 * | 11/2017 | Booth .................. G06F 12/0246 |
| 2002/0027508 A1 * | 3/2002 | Baba ........................ G06F 1/30 |
| | | 340/693.2 |
| 2010/0325522 A1 | 12/2010 | Tsukamoto et al. |

(Continued)

FOREIGN PATENT DOCUMENTS

| JP | 2014-120092 | 6/2014 |
| WO | 2009/107213 | 9/2009 |

*Primary Examiner* — Gabriel Chu
(74) *Attorney, Agent, or Firm* — Fujitsu Patent Center

(57) ABSTRACT

When a power failure of a volatile first storage occurs, an apparatus detects the power failure, and writes backup target data in a non-volatile second storage. When an abnormality of the first storage occurs, the apparatus detects the abnormality, acquires second information including a hardware state at a time when the abnormality is detected, and writes the first information and the second information in the second storage. When an abnormality occurs during the writing the backup target data, the apparatus suspends the writing the backup target data, acquires the second information, and writes backup data and the second information in the second storage, where the backup data is the backup target data that has not been written to the second storage.

9 Claims, 16 Drawing Sheets

(56) References Cited

U.S. PATENT DOCUMENTS

| | | | |
|---|---|---|---|
| 2011/0131365 A1* | 6/2011 | Zhang | G06F 11/1441 |
| | | | 711/103 |
| 2014/0173233 A1* | 6/2014 | Higashiyama | G06F 11/1441 |
| | | | 711/162 |
| 2015/0081958 A1* | 3/2015 | Li | G06F 1/30 |
| | | | 711/103 |
| 2016/0098328 A1* | 4/2016 | Lucas | G06F 1/26 |
| | | | 714/14 |
| 2016/0170897 A1* | 6/2016 | Solihin | G06F 12/1009 |
| | | | 711/207 |
| 2016/0246530 A1* | 8/2016 | Mylavarapu | G06F 3/0625 |

* cited by examiner

STORAGE CONTROL DEVICE WITH POWER FAILURE PROCESSING AND ABNORMALITY PROCESSING

CROSS-REFERENCE TO RELATED APPLICATION

This application is based upon and claims the benefit of priority of the prior Japanese Patent Application No. 2017-22722, filed on Feb. 10, 2017, the entire contents of which are incorporated herein by reference.

FIELD

The embodiments discussed herein are related to storage control device and method therefor.

BACKGROUND

Storage control devices control access to storage devices such as a hard disk drive (HDD) and a solid state drive (SSD). A storage control device includes a volatile storage device for storing data. Data stored in the volatile storage device disappears when a power failure occurs in the storage control device. Therefore, a technique for avoiding loss of data stored in a volatile storage device has been proposed. For example, a storage device saves data, which are stored in a cache memory, to a flash memory within discharge time of a battery at the time of a power failure. Further, for example, a storage device copies log data, which are stored in a memory log area of a random access memory (RAM), to a write buffer of the RAM while power is supplied from a battery at the time of a power failure. The storage device writes the log data, which are copied to the write buffer, into a flash memory.

International Publication Pamphlet No. WO 2009/107213 and Japanese Laid-open Patent Publication No. 2014-120092 are examples of related art.

SUMMARY

According to an aspect of the invention, when a power failure of a volatile first storage occurs, an apparatus detects the power failure, and writes backup target data in a non-volatile second storage. When an abnormality of the first storage occurs, the apparatus detects the abnormality, acquires second information including a hardware state at a time when the abnormality is detected, and writes the first information and the second information in the second storage. When an abnormality occurs during the writing the backup target data, the apparatus suspends the writing the backup target data, acquires the second information, and writes backup data and the second information in the second storage, where the backup data is the backup target data that has not been written to the second storage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a storage control device, a power failure and an abnormality other than a power failure sometimes occur at the same time. The storage control device sometimes does not complete processing in the case where there is not enough battery capacity when the storage control device executes power failure processing due to a power failure and abnormality processing due to an abnormality other than a power failure. For example, it is impossible for the storage control device to complete the power failure processing when the capacity of the battery runs out after executing the abnormality processing by receiving power supply from the battery. Therefore, the storage control device may lose data which are not backed up.

On the other hand, by securing a battery with sufficient capacity, the storage control device may avoid data loss. However, the expansion of the battery capacity increases the cost.

In one aspect, the present disclosure provides a storage control device and a storage control method by which loss of data is avoided at low cost.

Embodiments according to the present disclosure will be described below with reference to the accompanying drawings.

First Embodiment

Figure 1:
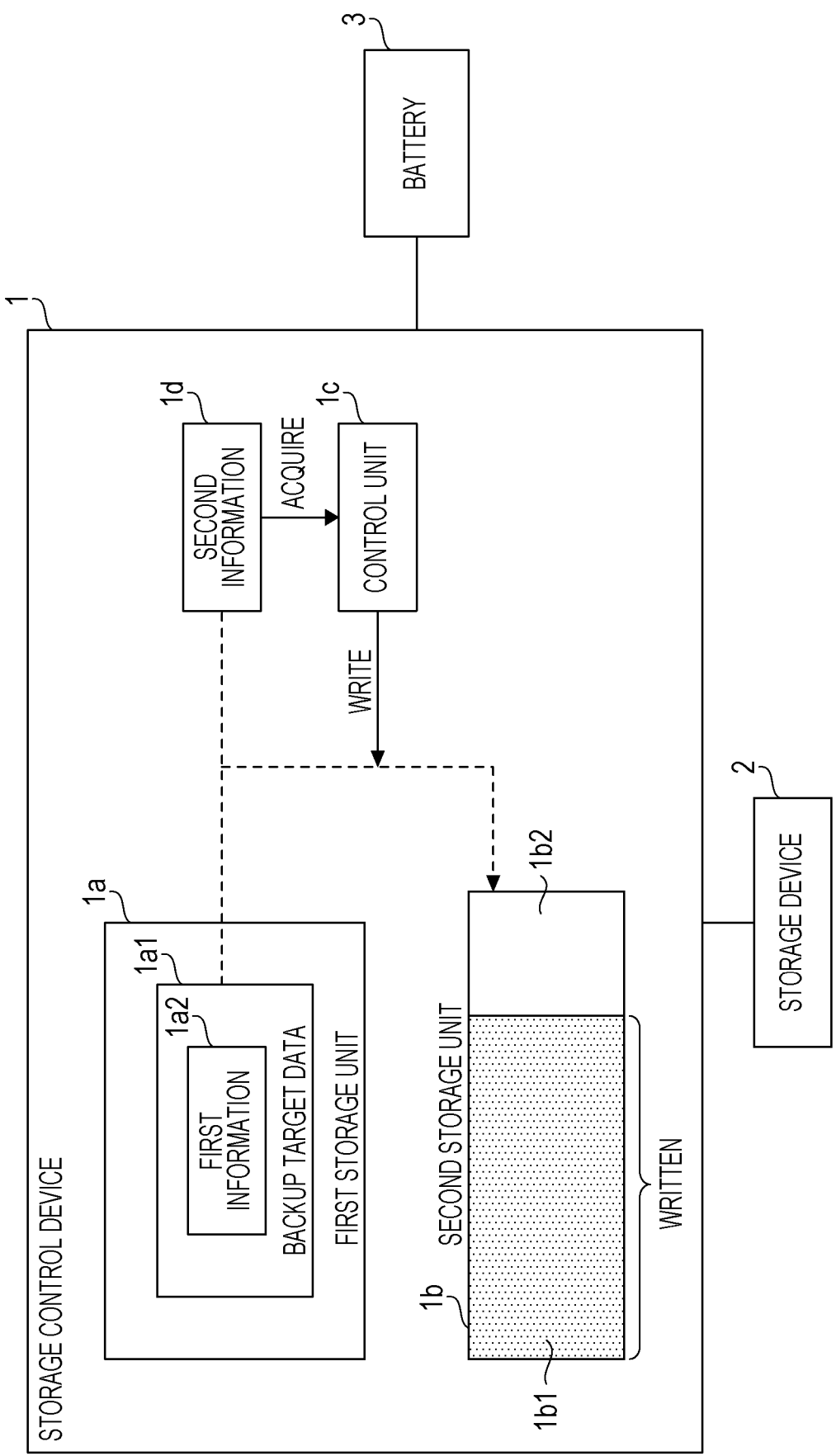
FIG. 1 is a diagram illustrating an example of a storage control device according to a first embodiment.

FIG. 1 is a diagram illustrating an example of a storage control device according to the first embodiment. A storage control device 1 controls a storage device 2 as a control target. The storage control device 1 includes a first storage unit 1a, a second storage unit 1b, and a control unit 1c.

A battery 3 is connected to the storage control device 1. The battery 3 supplies power to the storage control device 1 when a power failure occurs in the storage control device 1. Here, the battery 3 may be provided in the inside of the storage control device 1.

The first storage unit 1a is a volatile storage device such as a RAM. The first storage unit 1a stores backup target data 1a1. The backup target data 1a1 includes first information 1a2. The first information 1a2 is information on control of the storage device 2. For example, the first information 1a2 is information on an operating system (OS) related to control of the storage device 2, driver information, firmware management information, information on redundant arrays of inexpensive disks (RAID) of the storage device 2, or the like. The second storage unit 1b is a nonvolatile storage device such as an HDD and a flash memory.

The control unit 1c is capable of executing power failure processing. The control unit 1c executes the power failure processing when the control unit 1c detects a power failure. The control unit 1c detects a power failure and writes the backup target data 1a1 in the second storage unit 1b in the power failure processing.

The control unit 1c is capable of executing abnormality processing. When the control unit 1c detects an abnormality other than a power failure, the control unit 1c executes the abnormality processing. An abnormality other than a power failure is an abnormality of firmware, for example. The control unit 1c detects an abnormality other than a power failure and acquires second information 1d in the abnormality processing. The second information 1d is information on the state of the hardware at the time of detecting an abnormality. The second information 1d is information indicating whether or not a component in the storage control device 1 has failed at the time of detecting an abnormality, information indicating a temperature in the storage control device 1 at the time of detecting an abnormality, or the like, for example. Here, the control unit 1c may acquire the second information 1d from a storage device included in the storage control device 1. The storage device is a memory included in a field programmable gate array (FPGA), for example. After acquiring the second information 1d, the control unit 1c writes the first information 1a2 and the second information 1d in the second storage unit 1b.

The control unit 1c is capable of executing power failure suspension backup processing. When the control unit 1c detects an abnormality other than a power failure during execution of the power failure processing, the control unit 1c executes the power failure suspension backup processing. In the case where the control unit 1c has detected an abnormality other than a power failure during execution of the power failure processing, the control unit 1c suspends the power failure processing, in the power failure suspension backup processing. The control unit 1c acquires the second information 1d. In place of the abnormality processing, the control unit 1c writes data, which have not been written in the second storage unit 1b in the power failure processing, of the backup target data 1a1 and the second information 1d in the second storage unit 1b.

In terms of the second storage unit 1b in FIG. 1, an example of a state is illustrated in which a part of the backup target data 1a1 is written in an area 1b1 of the second storage unit 1b at the time of suspending the power failure processing. After suspending the power failure processing, the control unit 1c acquires the second information 1d. In place of the abnormality processing, the control unit 1c writes data, which have not been written in the second storage unit 1b in the power failure processing, of the backup target data 1a1 and the second information 1d in the area 1b2 of the second storage unit 1b.

According to the first embodiment, the storage control device 1 writes the backup target data 1a1 and the second information 1d in the second storage unit 1b, so that the storage control device 1 is capable of avoiding loss of the backup target data 1a1 and the second information 1d.

According to the first embodiment, after the storage control device 1 suspends the power failure processing by the power failure suspension backup processing, the storage control device 1 writes data, which have not been written in the second storage unit 1b in the power failure processing, of the backup target data 1a1 and the second information 1d in the second storage unit 1b. When it is assumed that the storage control device 1 does not execute the power failure suspension backup processing, after the storage control device 1 detects an abnormality other than a power failure during execution of the power failure processing, suspends the power failure processing, and executes the abnormality processing, the storage control device 1 restarts the power failure processing from the suspended state or starts the power failure processing from the beginning. Thus, in the case where the storage control device 1 does not execute the power failure suspension backup processing, the amount of processing after suspension of the power failure processing is larger than the case where the storage control device 1 executes the power failure suspension backup processing. When the storage control device 1 does not execute the power failure suspension backup processing, it is possible for the storage control device 1 to complete execution of the processing after suspension of the power failure processing by securing a sufficient battery capacity for the large processing amount. In order to secure a sufficient battery capacity, the battery capacity is enlarged. For example, the battery capacity of the battery 3 is enlarged. However, enlargement of the battery capacity of the battery 3 results in an increase in cost.

On the other hand, when the storage control device 1 executes the power failure suspension backup processing, the amount of processing after suspension of the power failure processing is smaller than the case where the storage control device 1 does not execute the power failure suspension backup processing. The storage control device 1 which executes the power failure suspension backup processing has a small amount of processing after suspension of the power failure processing, so that the storage control device 1 is capable of completing execution of the power failure suspension backup processing without enlarging the battery capacity of the battery 3.

Thus, according to the first embodiment, the storage control device 1 is capable of avoiding loss of data at low cost.

Second Embodiment

Figure 2:
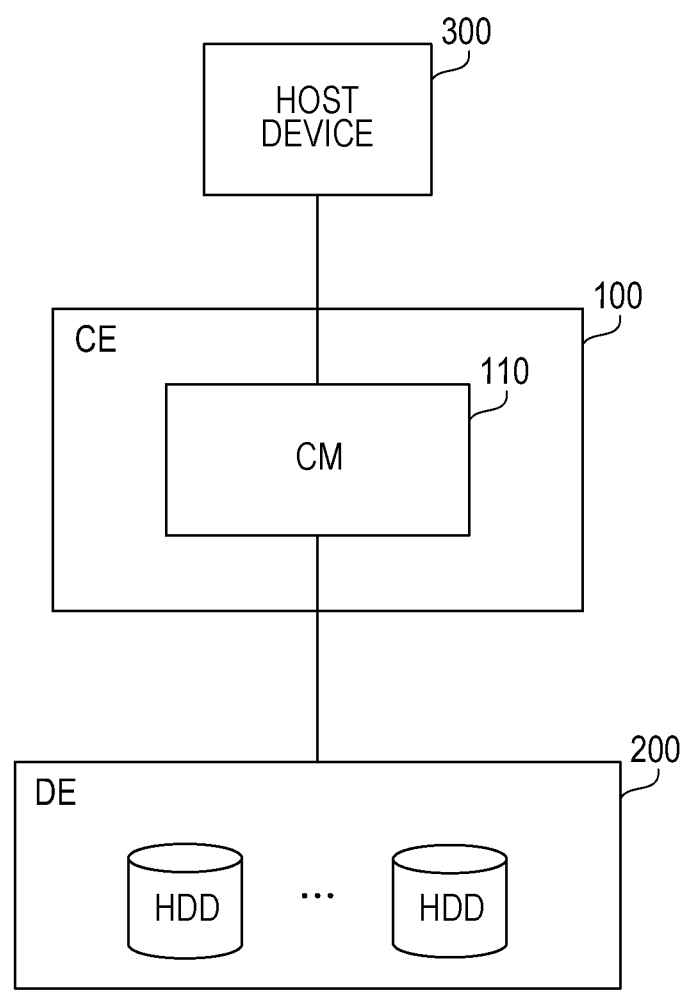
FIG. 2 is a diagram illustrating an example of a storage system according to a second embodiment.

FIG. 2 is a diagram illustrating an example of a storage system according to the second embodiment. The storage system includes a controller enclosure (CE) 100, a drive enclosure (DE) 200, and a host device 300. The CE 100 and the DE 200 may be realized as a storage device in which the CE 100 and the DE 200 are mounted in one casing.

The CE 100 includes a controller module (CM) 110. The CM 110 and the host device 300 are mutually connected via a network. For example, the CM 110 and the host device 300 are mutually connected by a transmission method such as a fibre channel (FC). The CM 110 controls access from the host device 300 to the DE 200.

The DE 200 is a disk array device which is capable of mounting a plurality of storage devices. The DE 200 mounts HDDs as storage devices. Further, the DE 200 may mount an SSD as a storage device.

Here, the CM 110 is a form of the storage control device 1 of the first embodiment. The DE 200 is one form of the storage device 2 of the first embodiment.

Figure 3:
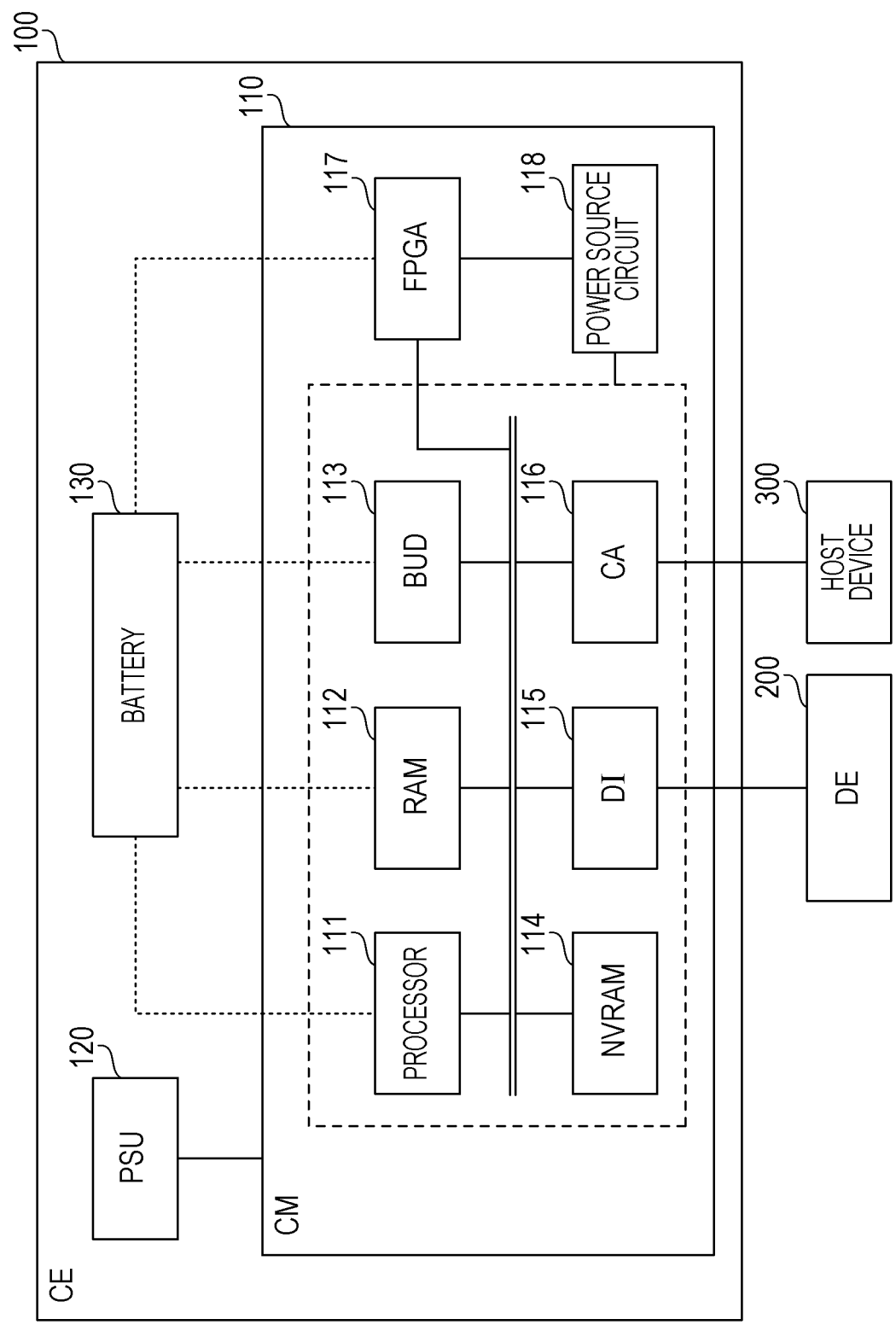
FIG. 3 is a diagram illustrating an example of hardware of a CE according to the second embodiment.

FIG. 3 is a diagram illustrating an example of hardware of the CE according to the second embodiment. The CE 100 includes a power supply unit (PSU) 120 and a battery 130 other than the CM 110.

The CM 110 includes a processor 111, a RAM 112, a bootup and utility device (BUD) 113, a non-volatile RAM (NVRAM) 114, a device interface (DI) 115, a channel adapter (CA) 116, the FPGA 117, and a power source circuit 118.

The processor 111 controls information processing of the CM 110. The processor 111 may include a central processing unit (CPU), a digital signal processor (DSP), an application specific integrated circuit (ASIC), and the like. The processor 111 may be a multi-processor which includes a plurality of processing elements.

The RAM 112 is a main storage device of the CM 110. The RAM 112 temporarily stores at least a part of an OS program or an application program which is to be executed by the processor 111. The RAM 112 stores various types of data used for processing performed by the processor 111.

The BUD 113 is a nonvolatile storage device which is used for protecting data stored in the RAM 112 when power supply from the PSU 120 is stopped. The BUD 113 is an SSD, for example.

The NVRAM 114 is an auxiliary storage device of the CM 110. The NVRAM 114 is a non-volatile storage device. The NVRAM 114 stores firmware programs, various types of data, and the like.

The DI 115 is an interface for communicating with the DE 200. The CA 116 is an interface for communicating with the host device 300.

The FPGA 117 monitors whether or not a power failure has occurred in the CM 110. The power source circuit 118 supplies power from the PSU 120 to each unit in the CM 110 under the control of the FPGA 117. In addition, the power source circuit 118 switches the power supply from the PSU 120 and the power supply from the battery 130 in response to an instruction from the FPGA 117.

The PSU 120 receives supply of commercial power from the outside and supplies the power to the CM 110. The battery 130 supplies power to the processor 111, the RAM 112, the BUD 113, and the FPGA 117 when the power supply from the PSU 120 to the CM 110 is stopped.

Here, the RAM 112 is one form of the first storage unit 1a of the first embodiment. The BUD 113 is one form of the second storage unit 1b of the first embodiment.

Figure 4:
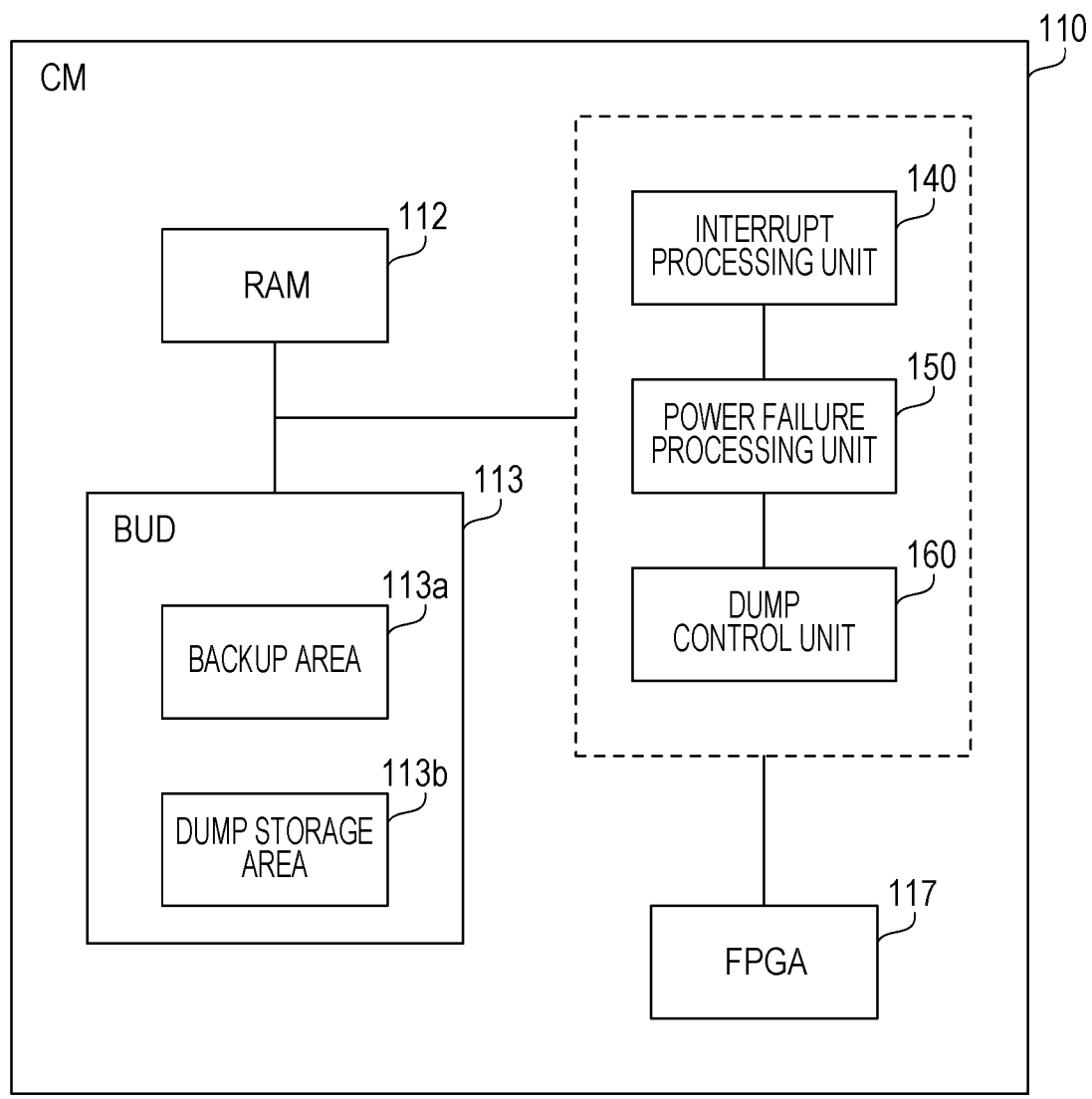
FIG. 4 is a diagram illustrating an example of a function of a CM according to the second embodiment.

FIG. 4 is a diagram illustrating an example of a function of the CM according to the second embodiment. The CM 110 includes an interrupt processing unit 140, a power failure processing unit 150, and a dump control unit 160.

The interrupt processing unit 140, the power failure processing unit 150, and the dump control unit 160 are realized when the processor 111 executes a predetermined program.

The interrupt processing unit 140 receives a non maskable interrupt (NMI) from the FPGA 117. In addition, the interrupt processing unit 140 executes release of the NMI or the like.

When a power failure occurs in the CM 110, the power failure processing unit 150 writes data, which is a backup target, of the data, which are stored in the RAM 112, in the BUD 113. When the power failure processing unit 150 writes data which is a backup target in the BUD 113, the power failure processing unit 150 divides the data, which is a backup target, into a predetermined size. The power failure processing unit 150 writes data blocks, which are obtained by dividing the data which is a backup target, in the BUD 113.

The dump control unit 160 executes panic processing when an abnormality occurs in the firmware executed by the processor 111. The panic processing will be described later in detail. Further, the dump control unit 160 executes power recovery processing when power is restored. The power recovery processing will be described later in detail.

The BUD 113 will now be described in detail. The BUD 113 includes a backup area 113a and a dump storage area 113b. The backup area 113a is a backup destination of data stored in the RAM 112. The dump storage area 113b stores a dump file which will be described later.

Figure 5:
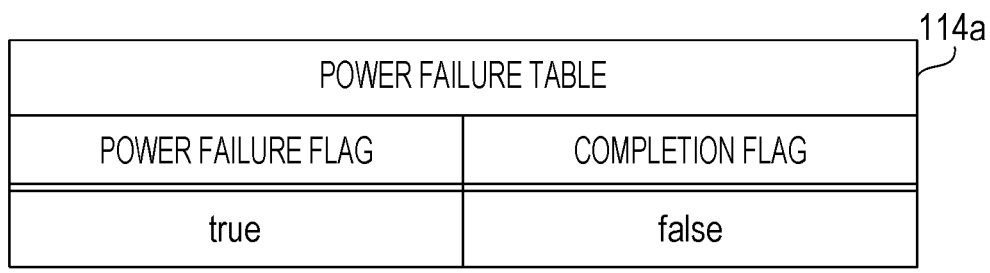
FIG. 5 is a diagram illustrating an example of a power failure table according to the second embodiment.

FIG. 5 is a diagram illustrating an example of a power failure table according to the second embodiment. The NVRAM 114 stores information of a power failure table 114a. The power failure table 114a includes items of power failure flag and completion flag. The item of power failure flag indicates either a state in which a power failure has occurred (true) or a state in which a power failure has not occurred (false). The item of completion flag indicates either completion (true) or incompletion (false) of backup of data from the RAM 112 to the backup area 113a.

Figure 6:
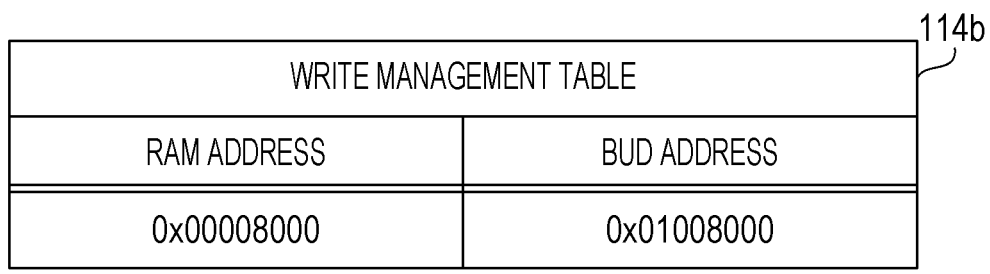
FIG. 6 is a diagram illustrating an example of a write management table according to the second embodiment.

FIG. 6 is a diagram illustrating an example of a write management table according to the second embodiment. The NVRAM 114 stores information of a write management table 114b. The write management table 114b includes items of RAM address and BUD address. The item of RAM address indicates a reading position of data which is a backup target and stored in the RAM 112. The CM 110 refers to the item of RAM address, being able to specify which data among the data, which are backup targets and stored in the RAM 112, have been written in the backup area 113a. In other words, by referring to the item of RAM address, the CM 110 is capable of specifying data which have not been written in the backup area 113a among the data which are backup targets and stored in the RAM 112.

The item of BUD address indicates a position, on which data read from the RAM 112 is written, in the backup area 113a.

Figure 7:
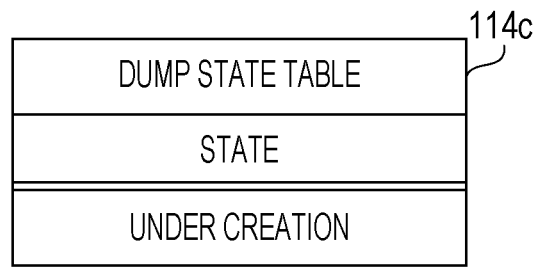
FIG. 7 is a diagram illustrating an example of a dump state table according to the second embodiment.

FIG. 7 is a diagram illustrating an example of a dump state table according to the second embodiment. The NVRAM 114 stores information of a dump state table 114c. The dump state table 114c includes an item of state. The item of state indicates a state from creation of a dump file to storage of the dump file in the dump storage area 113b. The item of state indicates any one of "under creation", "under writing", and "completion".

Figure 8:
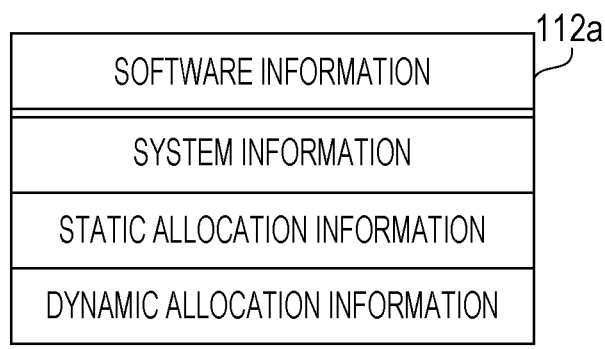
FIG. 8 is a diagram illustrating an example of software information according to the second embodiment.

FIG. 8 is a diagram illustrating an example of software information according to the second embodiment. The RAM 112 stores software information 112a. The software information 112a includes system information, static allocation information, and dynamic allocation information.

The system information includes information on an OS. The static allocation information includes configuration information of the CM 110, driver information, and information on the RAID. The dynamic allocation information includes firmware management information. The software information 112a may include information other than the system information and the like. The software information 112a may include log information, for example.

Here, the software information 112a is one form of the first information 1a2 of the first embodiment.

Figure 9:
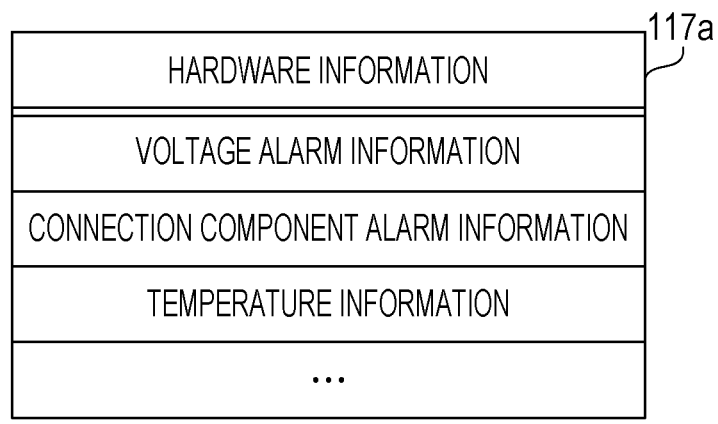
FIG. 9 is a diagram illustrating an example of hardware information according to the second embodiment.

FIG. 9 is a diagram illustrating an example of hardware information according to the second embodiment. The FPGA 117 stores hardware information 117a. The hardware information 117a includes voltage alarm information, connection component alarm information, temperature information, and the like. The voltage alarm information indicates whether or not a voltage in the CM 110 at the time of occurrence of an abnormality in the firmware exceeds a predetermined voltage. The connection component alarm information indicates whether or not components in the CM 110 at the time of occurrence of an abnormality in the firmware are failed. The temperature information indicates a temperature in the CM 110 at the time of occurrence of an abnormality in the firmware.

Here, the hardware information 117a is a form of the second information 1d of the first embodiment.

Figure 10:
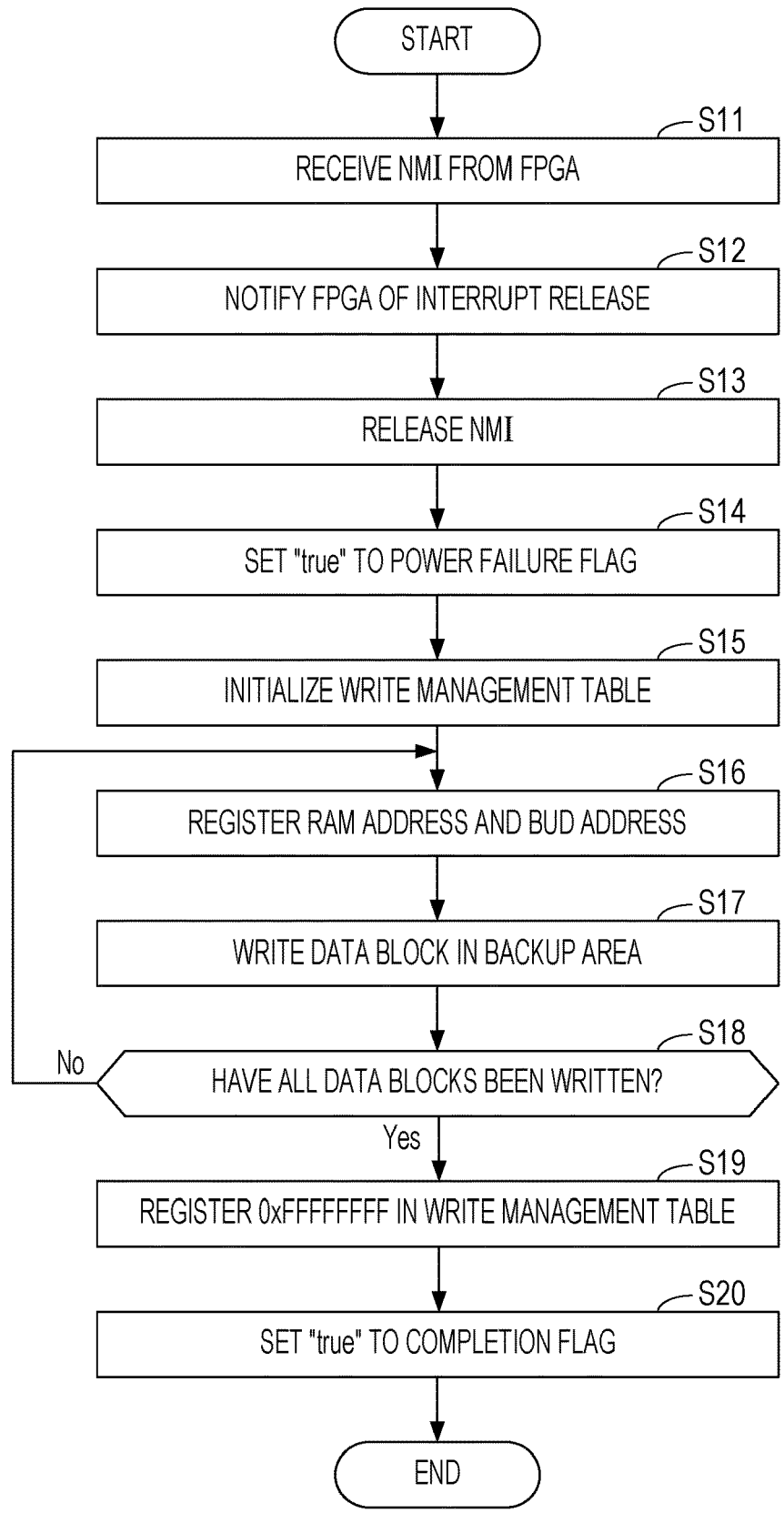
FIG. 10 is a diagram illustrating an example of a flowchart of power failure processing according to the second embodiment.

FIG. 10 is a diagram illustrating an example of a flowchart of the power failure processing according to the second embodiment. The CM 110 executes the power failure processing when a power failure occurs. Also, when a power failure occurs, the battery 130 supplies power to the processor 111, the RAM 112, the BUD 113, and the FPGA 117.

(S11) The interrupt processing unit 140 receives an NMI from the FPGA 117.

(S12) The interrupt processing unit 140 notifies the FPGA 117 of interrupt release.

(S13) The interrupt processing unit 140 releases the NMI.

(S14) The power failure processing unit 150 sets "true" to the item of power failure flag of the power failure table 114a.

(S15) The power failure processing unit 150 initializes the write management table 114b. That is, the power failure processing unit 150 registers 0 in the items of RAM address and BUD address of the write management table 114b.

(S16) The power failure processing unit 150 registers an address of the RAM 112, on which a data block which is a backup target and has not been written in the backup area 113a is stored, in the item of RAM address of the write management table 114b. Here, the power failure processing unit 150 stores data blocks which are backup targets in the backup area 113a in order from the head address of data which are backup targets and stored in the RAM 112. Therefore, in the case of initial writing to the backup area 113a, the power failure processing unit 150 registers the head address of the data which is the backup target in the item of RAM address of the write management table 114b.

The power failure processing unit 150 registers the address of the backup area 113a, which is a storage destination of the data block which is the backup target, in the item of BUD address of the write management table 114b.

Here, the software information 112a is included in data blocks which are the backup targets.

(S17) The power failure processing unit 150 refers to the item of RAM address of the write management table 114b and reads a data block which is the backup target from the RAM 112. The power failure processing unit 150 writes the data block which is the backup target to an address indicated by the item of BUD address in the write management table 114b.

(S18) The power failure processing unit 150 determines whether or not all data blocks which are backup targets and stored in the RAM 112 have been written in the backup area 113a. In the case where all data blocks have been written in the backup area 113a, the power failure processing unit 150 proceeds to step S19. In the case where all data blocks have not been written in the backup area 113a, the power failure processing unit 150 returns to step S16.

(S19) The power failure processing unit 150 registers 0xFFFFFFFF in the items of RAM address and BUD address of the write management table 114b.

(S20) The power failure processing unit 150 sets "true" to the item of completion flag of the power failure table 114a.

The CM 110 stops the power supply from the battery 130 to the processor 111, the RAM 112, the BUD 113, and the FPGA 117.

Thus, the power failure processing unit 150 is capable of indicating that the power failure processing unit 150 has been executing the power failure processing, by setting "true" to the item of power failure flag of the power failure table 114a.

Figure 11:
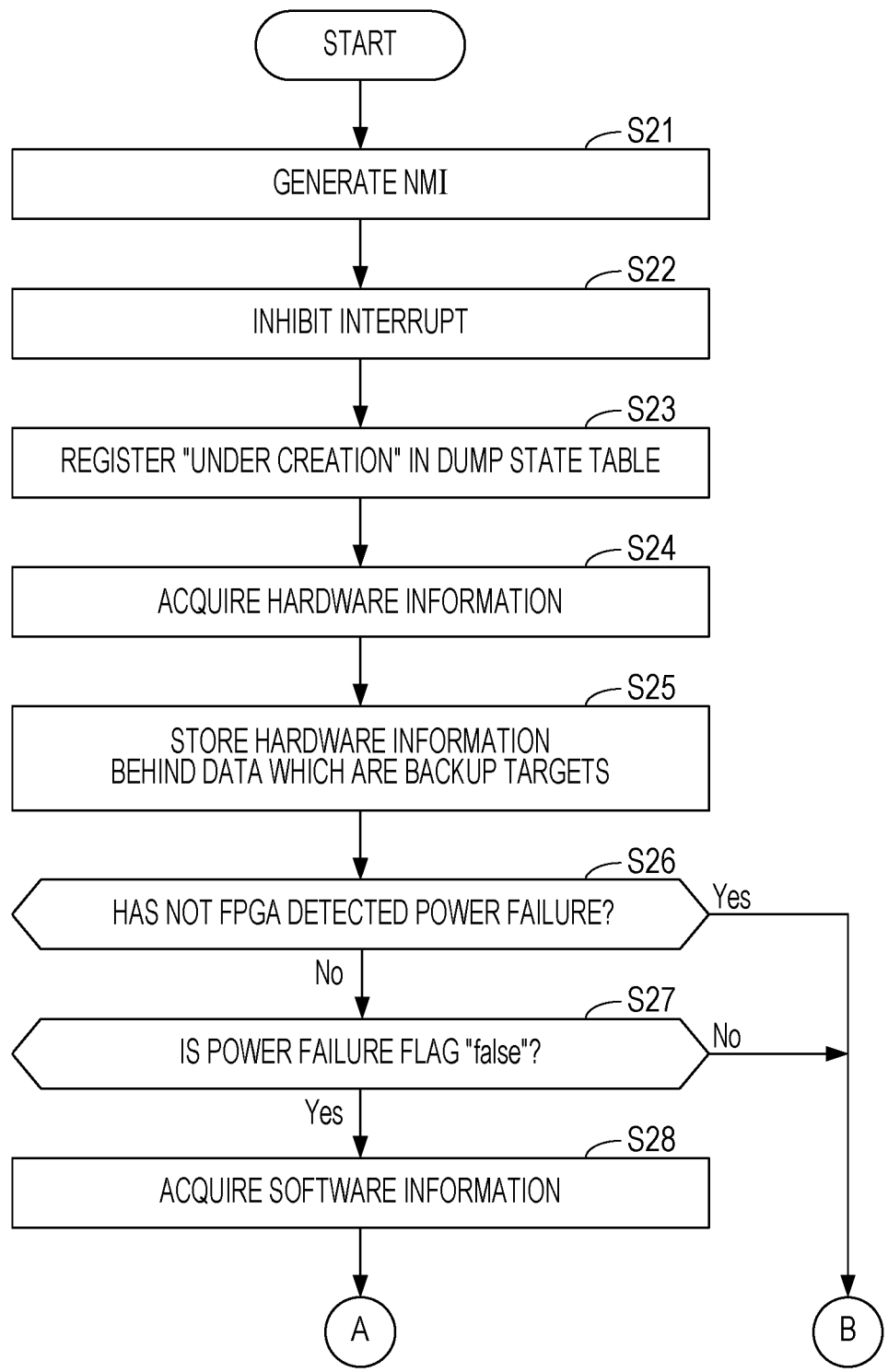
FIG. 11 is a diagram illustrating an example of a flowchart of panic processing according to the second embodiment.
Figure 12:
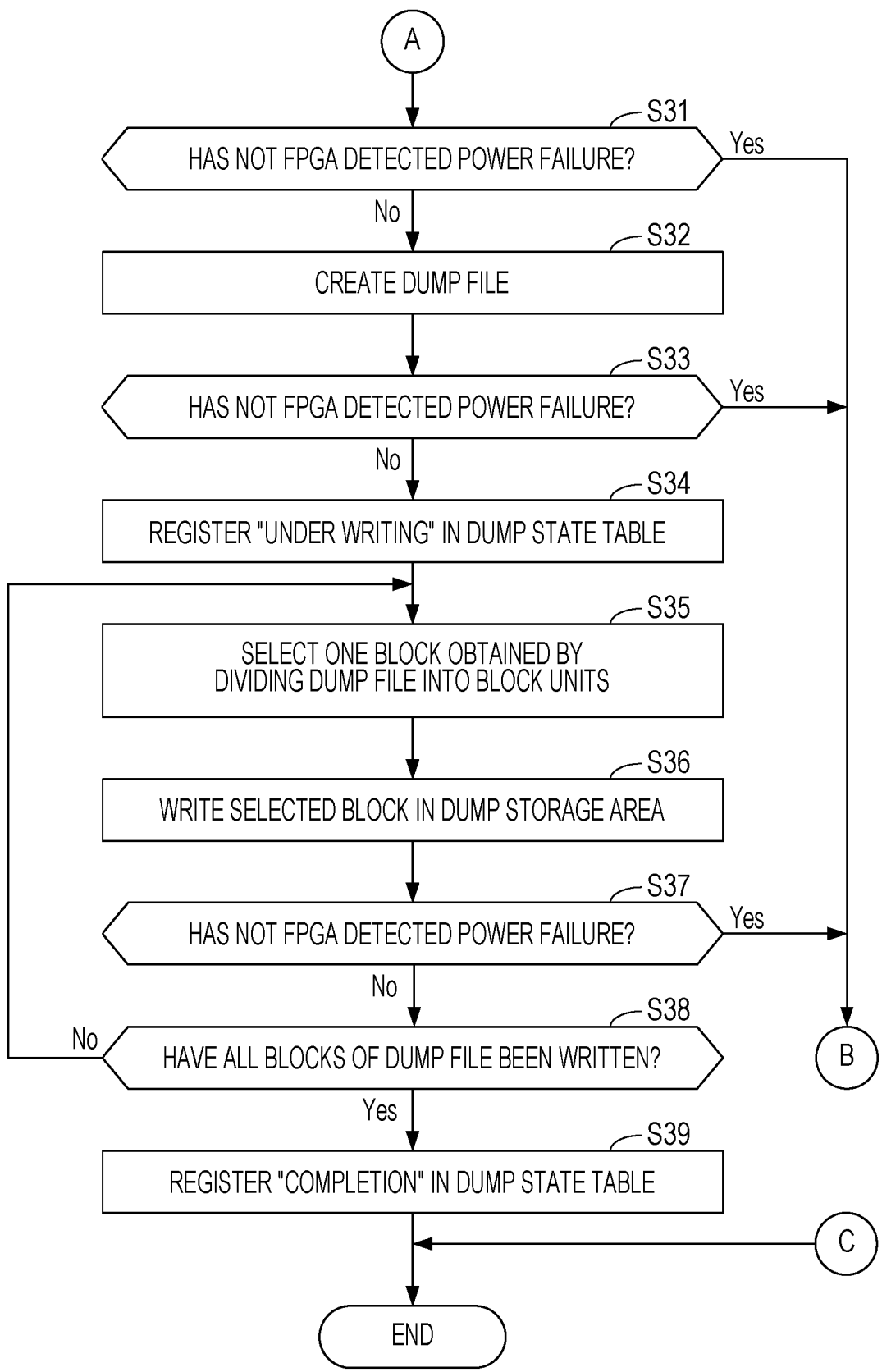
FIG. 12 is a diagram illustrating an example of a flowchart of the panic processing according to the second embodiment.
Figure 13:
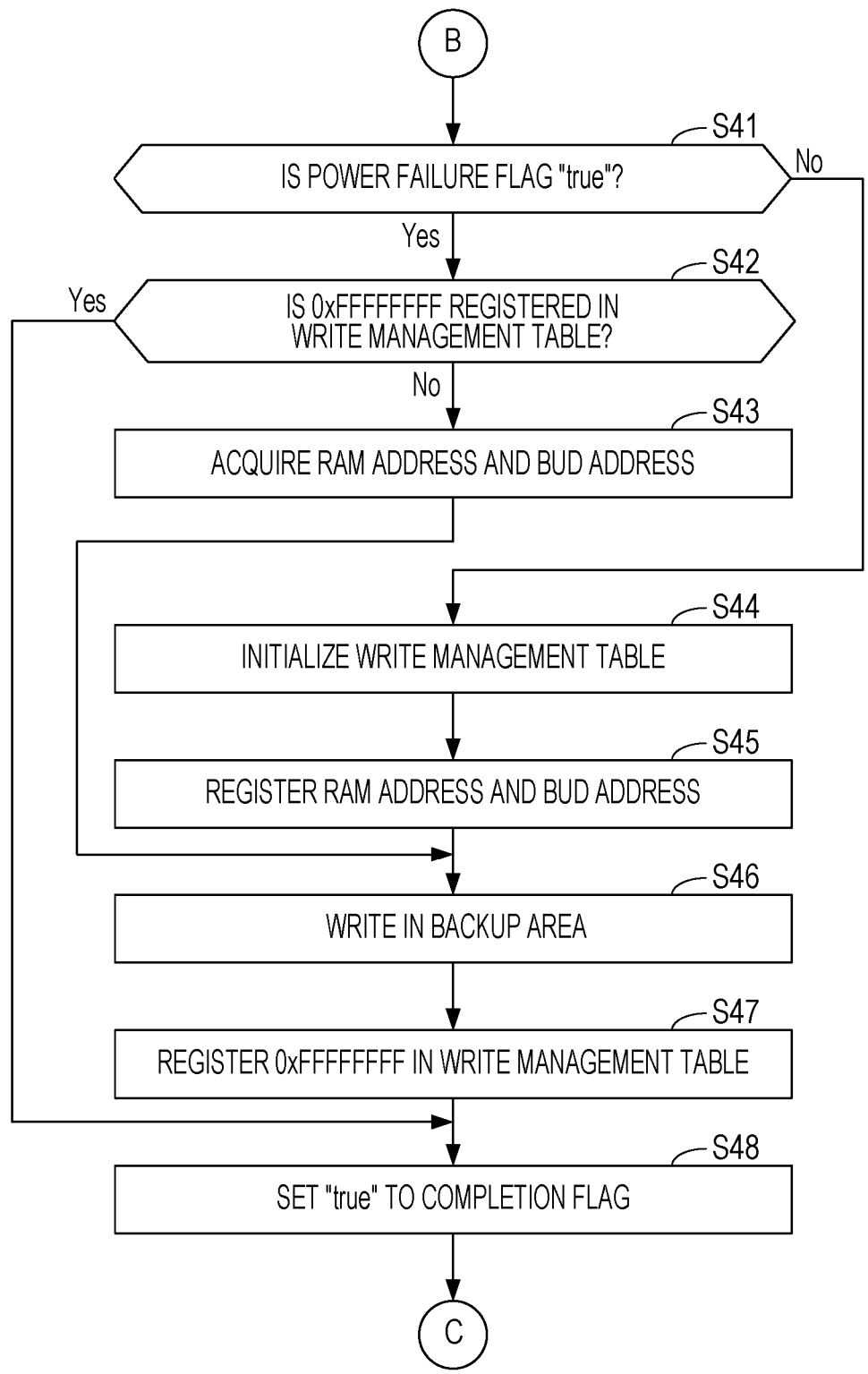
FIG. 13 is a diagram illustrating an example of a flowchart of the panic processing according to the second embodiment.

FIG. 11 is a diagram (I) illustrating an example of a flowchart of panic processing according to the second embodiment. FIG. 12 is a diagram (II) illustrating an example of a flowchart of the panic processing according to the second embodiment. FIG. 13 is a diagram (III) illustrating an example of a flowchart of the panic processing according to the second embodiment. The CM 110 executes the panic processing when the CM 110 detects an abnormality of the firmware. Here, an abnormality of the firmware may be detected by the interrupt processing unit 140.

(S21) The interrupt processing unit 140 generates an NMI.

(S22) The interrupt processing unit 140 inhibits an interrupt.

(S23) The dump control unit 160 registers "under creation" in the item of state of the dump state table 114c.

(S24) The dump control unit 160 acquires the hardware information 117a from the FPGA 117.

(S25) The dump control unit 160 stores the hardware information 117a behind data which are backup targets and stored in the RAM 112. Here, the software information 112a is included in the data which are the backup targets.

(S26) The dump control unit 160 determines whether or not the FPGA 117 has detected a power failure. In the case where the FPGA 117 has not detected a power failure, the dump control unit 160 proceeds to step S27. In the case where the FPGA 117 has detected a power failure, the dump control unit 160 proceeds to step S41.

Further, in the case where the FPGA 117 has detected a power failure, the battery 130 supplies power to the processor 111, the RAM 112, the BUD 113, and the FPGA 117. In the case where the FPGA 117 has detected a power failure in the following processing, the battery 130 supplies power to the processor 111, the RAM 112, the BUD 113, and the FPGA 117.

(S27) The dump control unit 160 refers to the item of power failure flag of the power failure table 114a and determines whether or not "false" is set. In the case of "false", the dump control unit 160 proceeds to step S28. In the case of "true", the dump control unit 160 proceeds to step S41.

(S28) The dump control unit 160 acquires the software information 112a from the RAM 112. The dump control unit 160 proceeds to step S31.

(S31) The dump control unit 160 determines whether or not the FPGA 117 has detected a power failure. In the case where the FPGA 117 has not detected a power failure, the dump control unit 160 proceeds to step S32. In the case where the FPGA 117 has detected a power failure, the dump control unit 160 proceeds to step S41.

(S32) The dump control unit 160 creates a dump file based on the software information 112a and the hardware information 117a.

(S33) The dump control unit 160 determines whether or not the FPGA 117 has detected a power failure. In the case where the FPGA 117 has not detected a power failure, the dump control unit 160 proceeds to step S34. In the case where the FPGA 117 has detected a power failure, the dump control unit 160 proceeds to step S41.

(S34) The dump control unit 160 registers "under writing" in the item of state of the dump state table 114c.

(S35) The dump control unit 160 selects one block obtained by dividing the dump file into block units of a predetermined size.

(S36) The dump control unit 160 writes the selected block in the dump storage area 113b.

(S37) The dump control unit 160 determines whether or not the FPGA 117 has detected a power failure. In the case where the FPGA 117 has not detected a power failure, the dump control unit 160 proceeds to step S38. In the case where the FPGA 117 has detected a power failure, the dump control unit 160 proceeds to step S41.

(S38) The dump control unit 160 determines whether or not all blocks of the dump file have been written in the dump storage area 113b. In the case where all blocks of the dump file have been written in the dump storage area 113b, the dump control unit 160 proceeds to step S39. In the case where all blocks of the dump file have not been written in the dump storage area 113b, the dump control unit 160 returns to step S35.

(S39) The dump control unit 160 registers "completion" in the item of state of the dump state table 114c. The dump control unit 160 ends the panic processing.

(S41) The dump control unit 160 refers to the item of power failure flag of the power failure table 114a and determines whether or not "true" is set. In the case of "true", the dump control unit 160 specifies that the power failure processing is suspended halfway and a part of data which are backup targets and stored in the RAM 112 has not been written in the backup area 113a. The dump control unit 160 proceeds to step S42. In the case of "false", the dump control unit 160 proceeds to step S44.

(S42) The dump control unit 160 refers to the items of RAM address and BUD address of the write management table 114b and determines whether or not 0xFFFFFFFF is registered. In the case where 0xFFFFFFFF is not registered, that is, the case where the power failure processing is executed halfway, the dump control unit 160 proceeds to step S43. In the case where 0xFFFFFFFF is registered, the dump control unit 160 proceeds to step S48.

(S43) The dump control unit 160 refers to the write management table 114b and acquires a RAM address and a BUD address. The dump control unit 160 proceeds to step S46.

(S44) The dump control unit 160 initializes the write management table 114b.

(S45) The dump control unit 160 registers a head address of the RAM 112 in the item of RAM address of the write management table 114b. The dump control unit 160 registers a head address of the backup area 113a in the item of BUD address of the write management table 114b.

(S46) The dump control unit 160 executes data writing to the backup area 113a based on the information registered in the item of RAM address and the item of BUD address of the write management table 114b. Step S46 will now be detailed.

When step S43 is executed, the dump control unit 160 refers to the RAM address of the write management table 114b and specifies data blocks which have not been written in the backup area 113a. Further, the dump control unit 160 includes the hardware information 117a, which is stored in the RAM 112, in the data blocks which have not been written. The dump control unit 160 writes the data blocks, which have not been written, to an address following the address registered in the item of BUD address in the write management table 114b. As a result, it is possible for the backup area 113a to store all data blocks, which are backup targets and include the software information 112a, and the hardware information 117a.

When step S45 is executed, the dump control unit 160 stores all data, which are stored in the RAM 112, in the backup area 113a. Thus, the backup area 113a stores the software information 112a and the hardware information 117a.

(S47) The dump control unit 160 registers 0xFFFFFFFF in the items of RAM address and BUD address of the write management table 114b.

(S48) The dump control unit 160 sets "true" to the item of completion flag of the power failure table 114a. The dump control unit 160 ends the panic processing.

After step S48, the CM 110 stops the power supply from the battery 130 to the processor 111, the RAM 112, the BUD 113, and the FPGA 117.

Thus, the dump control unit 160 monitors whether or not the FPGA 117 has detected a power failure. When the FPGA 117 detects a power failure, the dump control unit 160 determines that a power failure has occurred in the CM 110, and proceeds to step S41. Thus, the dump control unit 160 determines that a power failure has occurred in the CM 110 and executes step S41 immediately, whereby being able to avoid waste of the power amount of the battery 130.

Figure 14:
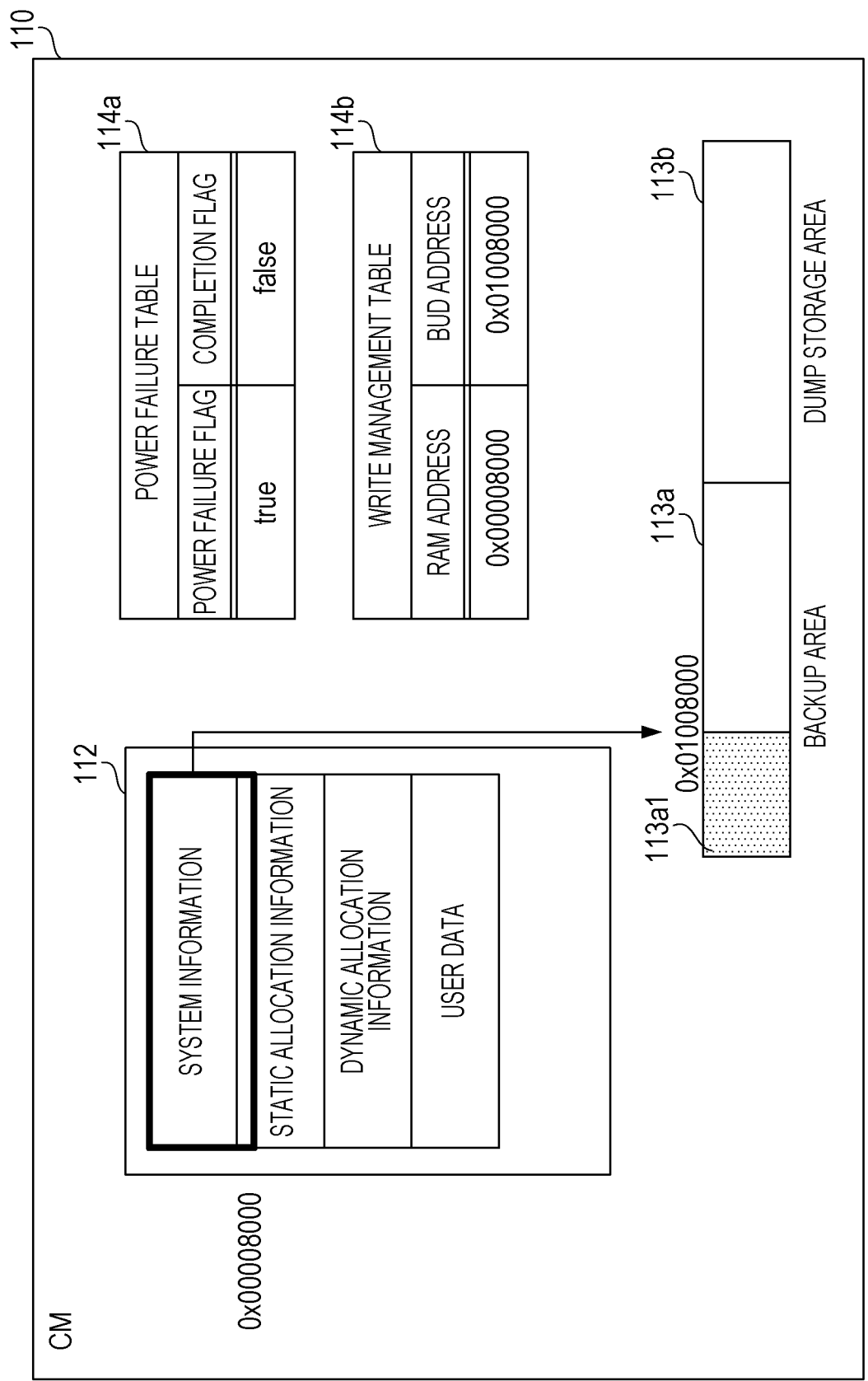
FIG. 14 is a diagram illustrating a specific example in the case where an abnormality of firmware has occurred during the power failure processing according to the second embodiment.

FIG. 14 is a diagram (I) illustrating a specific example in the case where an abnormality of the firmware has occurred during the power failure processing according to the second embodiment. The RAM 112 stores system information, static allocation information, dynamic allocation information, and user data. In the specific example, the system information, the static allocation information, the dynamic allocation information, and the user data are data which are backup targets.

FIG. 14 illustrates a state in which a power failure has occurred in the CM 110. The power failure processing unit 150 sets "true" to the item of power failure flag of the power failure table 114a in accordance with the occurrence of the power failure.

FIG. 14 illustrates a state in which the system information and a part of the static allocation information which are stored in the RAM 112 are stored in the area 113a1 of the backup area 113a by the power failure processing unit 150. In addition, the write management table 114b in FIG. 14 indicates that data stored at the address (0x00008000) of the RAM 112 is written in the address (0x01008000) of the BUD 113.

Figure 15:
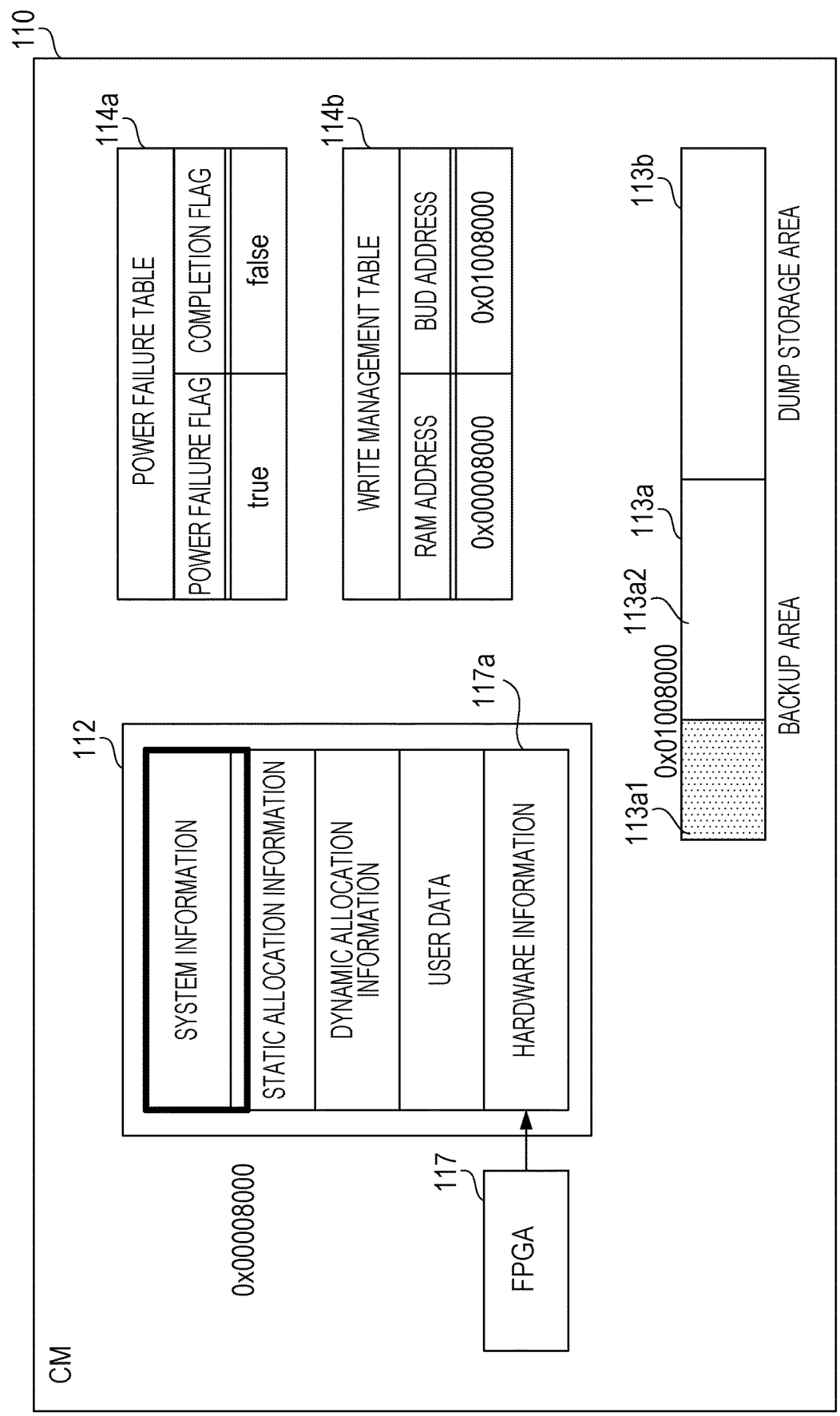
FIG. 15 is a diagram illustrating a specific example in the case where an abnormality of the firmware has occurred during the power failure processing according to the second embodiment.

FIG. 15 is a diagram (II) illustrating a specific example in the case where an abnormality of the firmware has occurred during the power failure processing according to the second embodiment. FIG. 15 illustrates a state in which an abnormality has occurred in the firmware. The power failure processing unit 150 suspends the power failure processing in accordance with the occurrence of the abnormality in the firmware.

The dump control unit 160 acquires the hardware information 117a from the FPGA 117. The dump control unit 160 stores the hardware information 117a behind data which are backup targets.

The dump control unit 160 refers to the item of RAM address of the write management table 114b and specifies that data stored after the address (0x00008000) of the RAM 112 are data which have not been written in the backup area 113a. That is, the data which have not been written are a part of the static allocation information, the dynamic allocation information, and the user data. The dump control unit 160 includes the hardware information 117a in the data which have not been written. The dump control unit 160 writes the data, which have not been written in the backup area 113a, in an area 113a2 of the backup area 113a.

Figure 16:
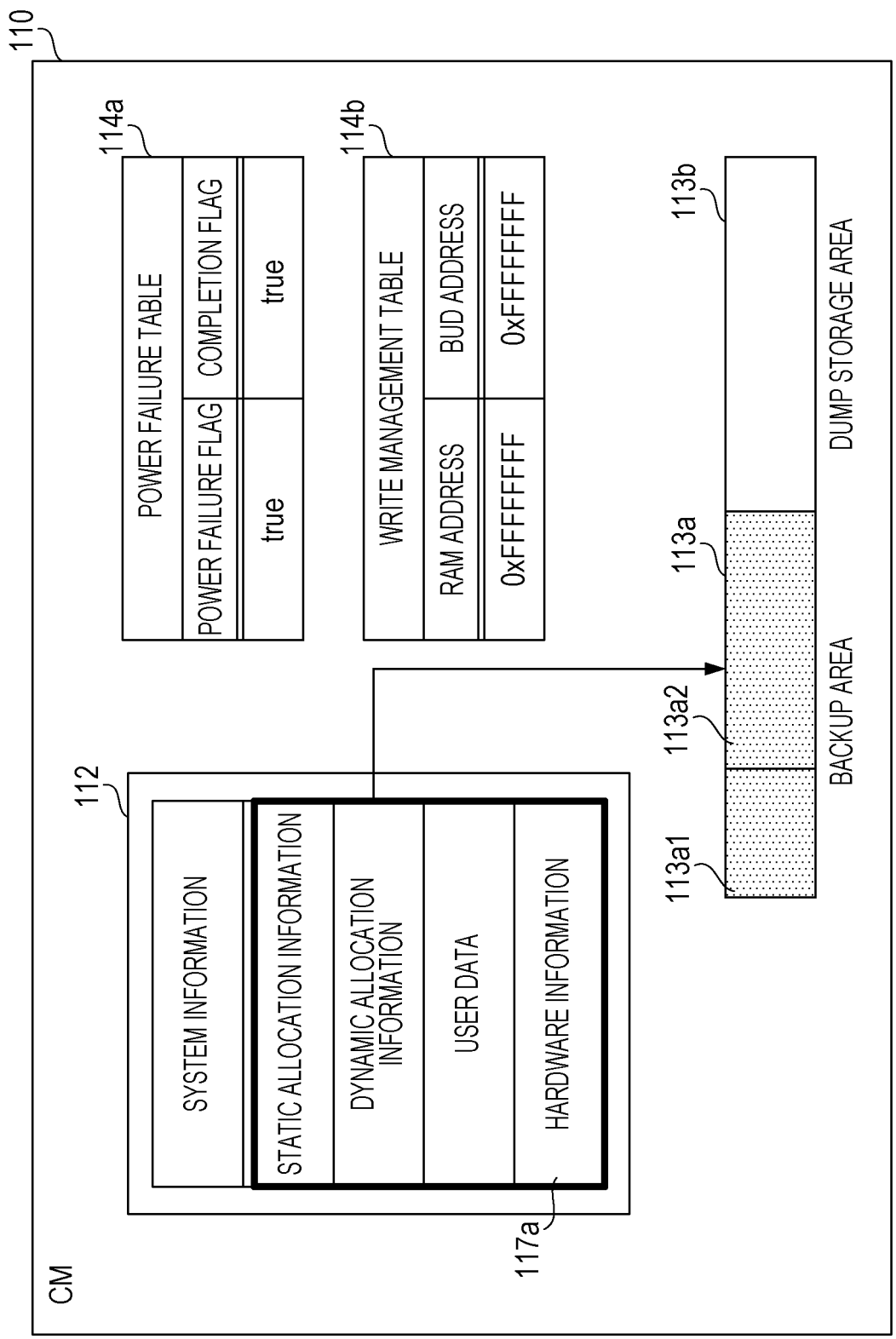
FIG. 16 is a diagram illustrating a specific example in the case where an abnormality of the firmware has occurred during the power failure processing according to the second embodiment.

FIG. 16 is a diagram (III) illustrating a specific example in the case where an abnormality of the firmware has occurred during the power failure processing according to the second embodiment. FIG. 16 illustrates a state in which data which have not been written are stored in the area 113a2 of the backup area 113a.

Thus, the CM 110 writes unwritten data in the area 113a2, being able to avoid loss of data.

According to the second embodiment, the CM 110 suspends the power failure processing and then, writes unwritten data in the backup area 113a. When it is assumed that the CM 110 does not execute the processing of the second embodiment, the CM 110 detects an abnormality of the firmware during execution of the power failure processing. After the detection, the CM 110 suspends the power failure processing, writes the dump file 400 in the dump storage area 113b, and restarts the power failure processing from the suspended state or starts the power failure processing from the beginning. In the case where the CM 110 does not execute the processing of the second embodiment, the CM 110 receives power supply from a large-capacity battery due to the large amount of processing.

In the case where the CM 110 executes the processing of the second embodiment, the processing amount after suspension of the power failure processing is smaller than that in the case where the CM 110 does not execute the processing of the second embodiment. Since the processing amount in the case where the CM 110 executes the processing of the second embodiment is small, the CM 110 does not have to receive power supply from a large-capacity battery. Accordingly, the battery 130 does not have to have large capacity and the battery 130 may be a low-cost battery. Thus, the CM 110 is capable of avoiding loss of data at low cost.

Since the software information 112a (system information, static allocation information, dynamic allocation information) and the hardware information 117a are stored in the backup area 113a, the CM 110 is capable of creating a dump file after power recovery.

Figure 17:
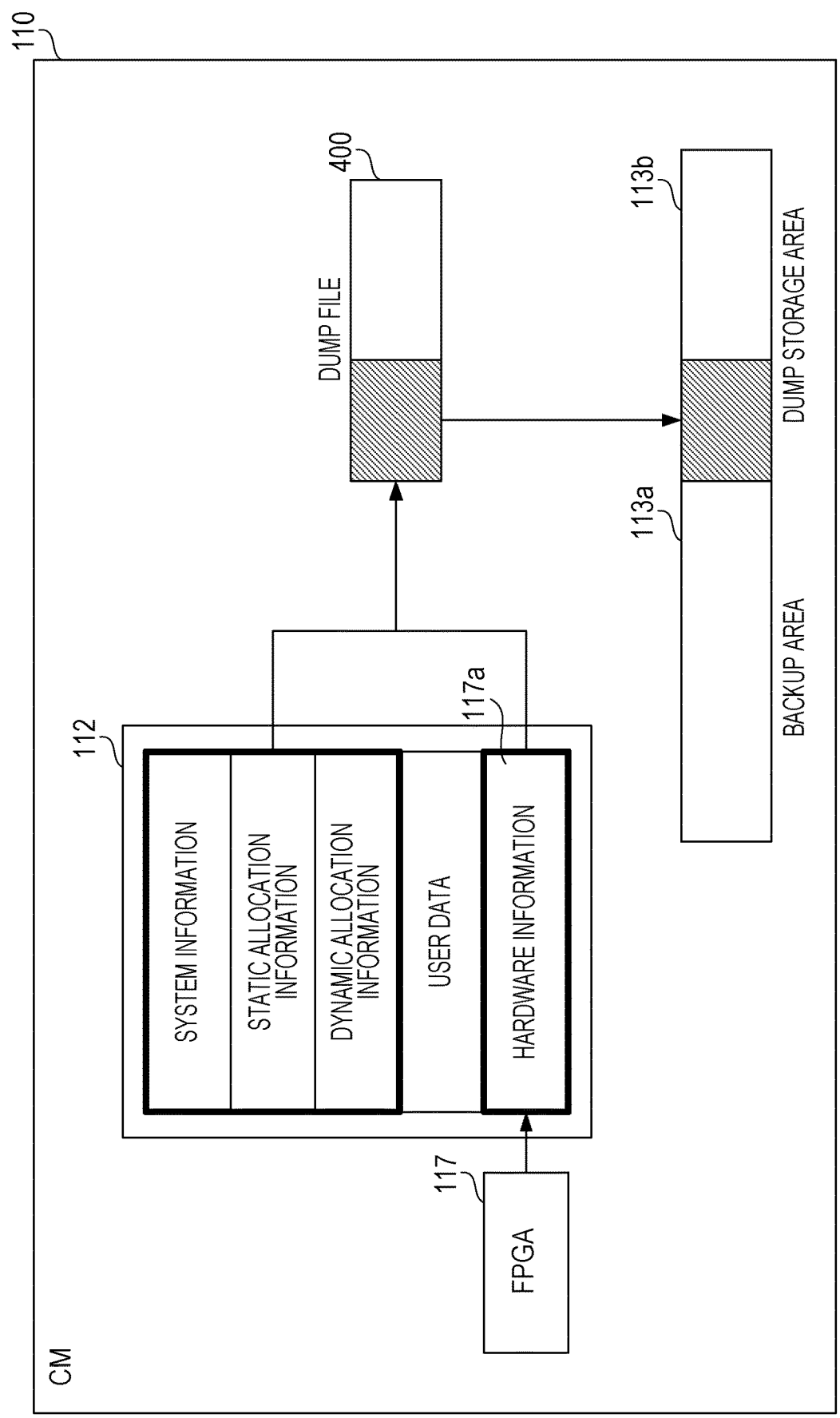
FIG. 17 is a diagram illustrating a specific example in the case where a power failure has occurred during the panic processing according to the second embodiment.

FIG. 17 is a diagram (I) illustrating a specific example in the case where a power failure has occurred during the panic processing according to the second embodiment. The RAM 112 stores system information, static allocation information, dynamic allocation information, and user data.

FIG. 17 illustrates a state in which an abnormality has occurred in the firmware. The dump control unit 160 acquires the hardware information 117a from the FPGA 117. The dump control unit 160 stores the hardware information 117a behind data which are backup targets.

The dump control unit 160 creates the dump file 400 based on the software information 112a (the system information, the static allocation information, the dynamic allocation information) and the hardware information 117a. The dump control unit 160 writes a block, which is obtained by dividing the dump file 400 into block units, in the dump storage area 113b.

Figure 18:
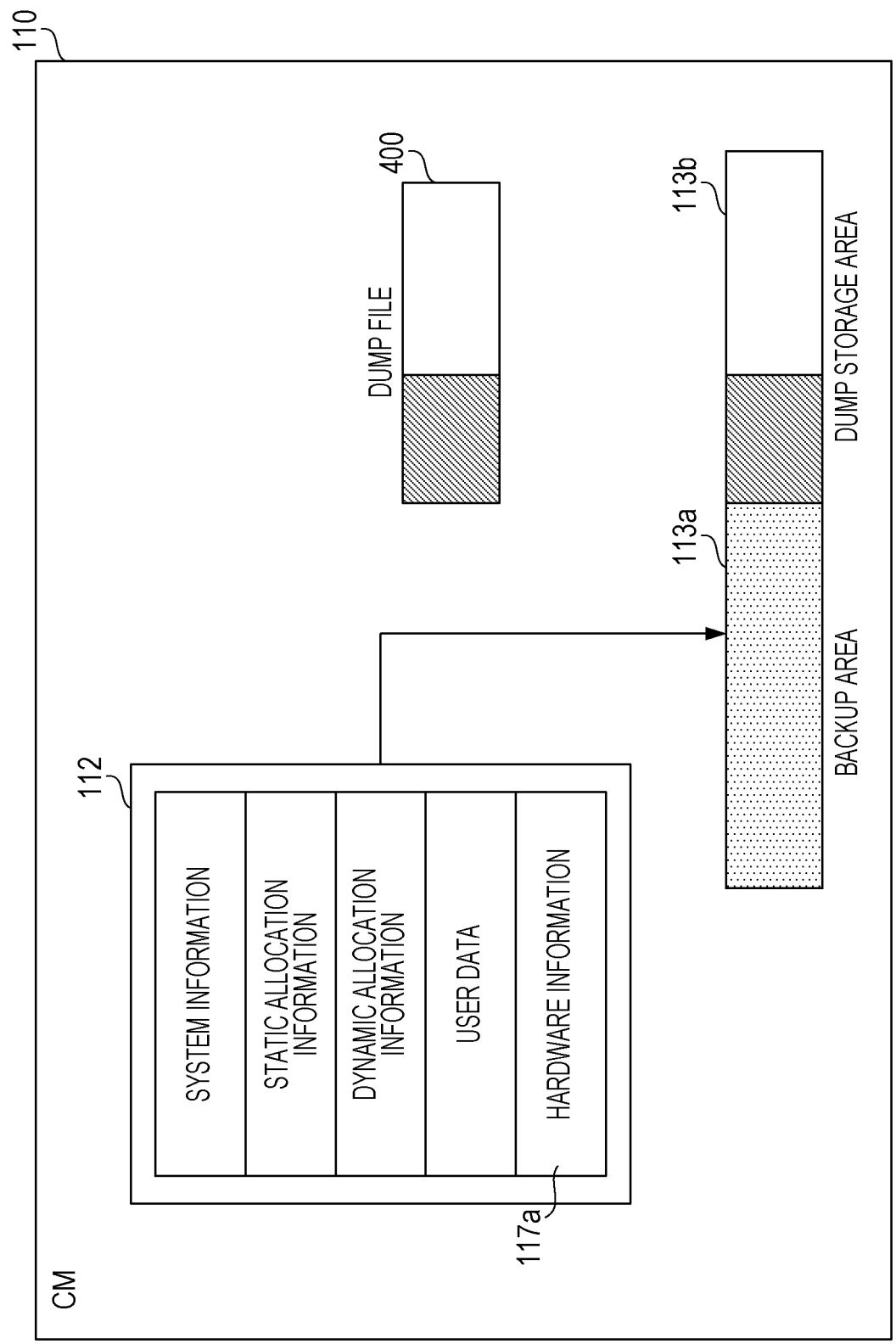
FIG. 18 is a diagram illustrating a specific example in the case where a power failure has occurred during the panic processing according to the second embodiment.

FIG. 18 is a diagram (II) illustrating a specific example in the case where a power failure has occurred during the panic processing according to the second embodiment. FIG. 18 illustrates a state in which a power failure has occurred. The dump control unit 160 suspends writing of the dump file 400 into the dump storage area 113b as a result of the occurrence of the power failure. The processing of writing the dump file 400 in the dump storage area 113b is one form of the abnormality processing of the first embodiment.

The dump control unit 160 stores all data, which are stored in the RAM 112, in the backup area 113a.

Thus, the CM 110 stores all data, which are stored in the RAM 112, in the backup area 113a, being able to avoid loss of data. Further, the CM 110 stores all data, which are stored in the RAM 112, in the backup area 113a, being able to store the software information 112a (the system information, the static allocation information, the dynamic allocation information) and the hardware information 117a in the backup area 113a. Accordingly, when a power failure occurs in the CM 110, the CM 110 does not have to continue the processing of writing the dump file 400 in the BUD 113. It is sufficient for the battery 130 to have the amount of power which enables execution of processing for storing all data, which are stored in the RAM 112, in the backup area 113a, and thus, the battery 130 does not have to be a large-capacity battery. That is, the battery 130 may be a low-cost battery. Thus, the CM 110 is capable of avoiding loss of data at low cost.

Since the software information 112a (system information, static allocation information, dynamic allocation information) and the hardware information 117a are stored in the backup area 113a, the CM 110 is capable of creating a dump file after power recovery.

Figure 19:
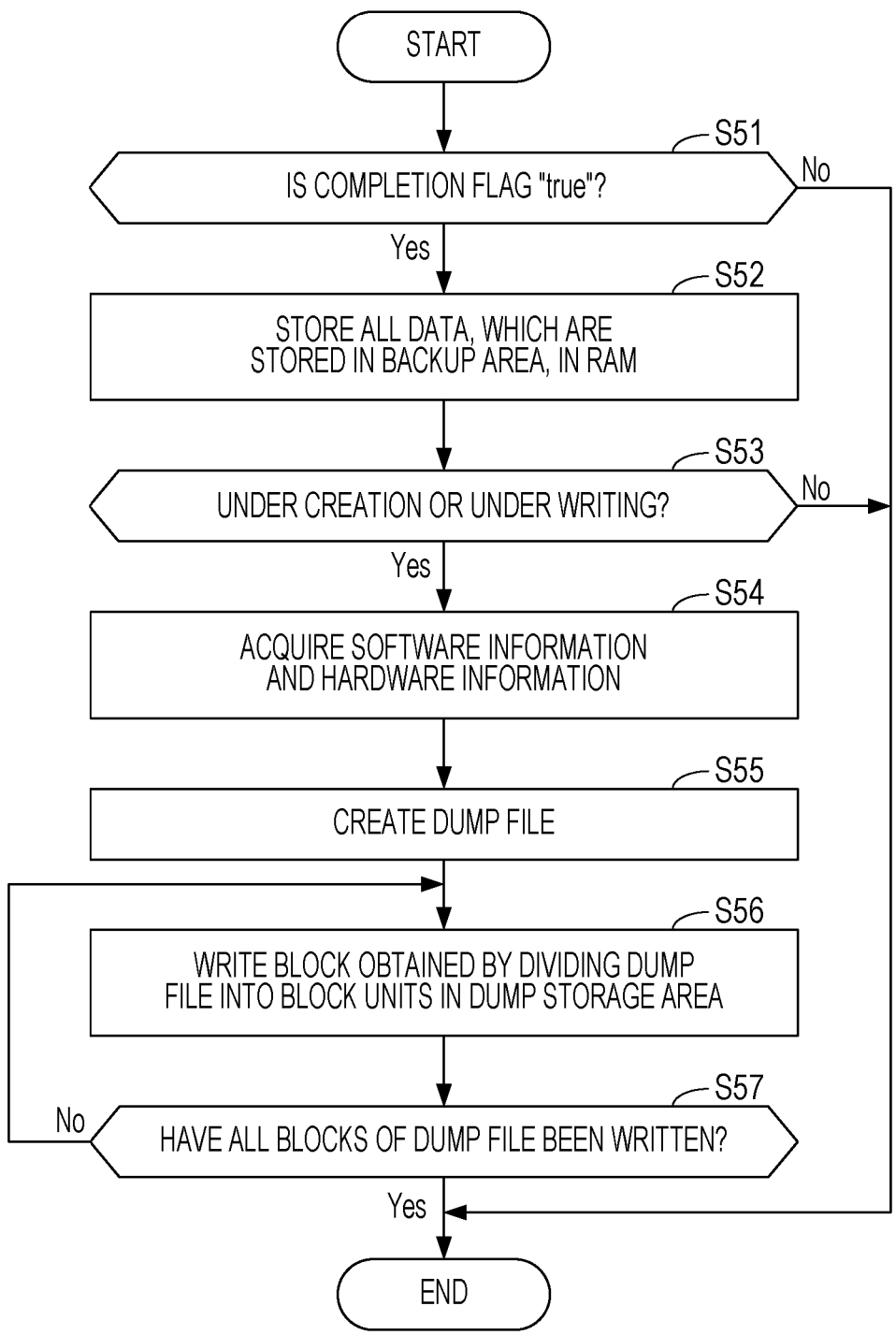
FIG. 19 is a diagram illustrating an example of a flowchart of power recovery processing according to the second embodiment.

FIG. 19 is a diagram illustrating an example of a flowchart of power recovery processing according to the second embodiment. When the CM 110 receives power supply from the PSU 120 and detects power recovery after a power failure, the CM 110 executes the power recovery processing.

(S51) The dump control unit 160 refers to the item of completion flag of the power failure table 114a and determines whether or not "true" is set. In the case of "true", the dump control unit 160 proceeds to step S52. In the case of "false", the dump control unit 160 ends the power recovery processing.

(S52) The dump control unit 160 stores all data, which are stored in the backup area 113a, in the RAM 112. Accordingly, the RAM 112 stores data including the software information 112a and the hardware information 117a.

(S53) The dump control unit 160 refers to the item of state of the dump state table 114c and determines whether or not the state is "under creation" or "under writing". In the case of "under creation" or "under writing", the dump control unit 160 proceeds to step S54. In the case other than the state of "under creation" or "under writing", that is, in the case of "completion", the dump control unit 160 ends the power recovery processing.

(S54) The dump control unit 160 acquires the software information 112a and the hardware information 117a from the RAM 112.

(S55) The dump control unit 160 creates a dump file based on the software information 112a and the hardware information 117a.

(S56) The dump control unit 160 writes a block, which is obtained by dividing the dump file into block units of a predetermined size, in the dump storage area 113b.

(S57) The dump control unit 160 determines whether or not all the blocks of the dump file have been written in the dump storage area 113b. In the case where all the blocks of the dump file have been written in the dump storage area 113b, the dump control unit 160 ends the power recovery processing. In the case where all the blocks of the dump file have not been written in the dump storage area 113b, the dump control unit 160 returns to step S56.

Thus, the dump control unit 160 is capable of storing the dump file in the dump storage area 113b. The CM 110 is capable of analyzing a cause of an abnormality of the firmware by using the dump file.

Here, in the case where a part of the dump file has already been written in the dump storage area 113b (in the case where writing of the dump file is suspended halfway) in step S56, the dump control unit 160 may write only blocks, which have not been written, in the dump storage area 113b.

Further, it is possible to realize the information processing of the first embodiment by making a processor used for the storage control device 1 execute a program. It is possible to realize the information processing of the second embodiment by making the processor 111 execute a program. The program may be recorded in a computer readable recording medium.

For example, a recording medium on which a program is recorded may be distributed by distributing the program. In addition, programs for implementing the functions corresponding to the interrupt processing unit 140, the power failure processing unit 150, and the dump control unit 160 may be individually distributed as separate programs. The functions of the interrupt processing unit 140, the power failure processing unit 150, and the dump control unit 160 may be realized by separate computers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control device comprising:
a first memory that is a volatile storage configured to store backup target data, the backup target data including first information on control of a storage device;
a second memory that is a non-volatile storage; and
a processor coupled to the first and second memories, the processor configured to execute:
power failure processing in which the processor detects a power failure and writes the backup target data in the second memory,
abnormality processing in which the processor detects an abnormality other than the power failure, acquires second information on a state of hardware at time of detection of the abnormality, and writes the first information and the second information in the second memory, and
power failure suspension backup processing in which the processor detects the abnormality during execution of the power failure processing, suspends the power failure processing, acquires the second information, and writes backup data, the backup data being the backup target data that has not been written to the second memory during the power failure processing, and the second information in the second memory.

2. The storage control device according to claim 1, wherein the processor executes abnormality suspension backup processing in which the processor writes the first information and the second information in the second memory after the processor stores the second information in the first memory in the abnormality processing, and, in a case where the processor detects the power failure during execution of the abnormality processing, the processor suspends the abnormality processing and writes all data stored in the first memory in the second memory.

3. The storage control device according to claim 2, wherein the processor is further configured to monitor whether or not the power failure has occurred, wherein the processor monitors whether or not the monitoring device has detected the power failure during execution of the abnormality processing, and when the processor has detected the power failure, the processor detects the power failure and suspends the abnormality processing by the abnormality suspension backup processing.

4. The storage control device according to claim 1, further comprising a third memory that stores the second information, wherein the processor acquires the second information from the third memory in the abnormality processing or the power failure suspension backup processing.

5. The storage control device according to claim 1, wherein the processor creates writing information during the power failure processing and uses the writing information to specify data of the backup target data based on the writing information during the power failure suspension backup processing, the writing information indicating a writing state of the backup target data into the second memory and the backup target data having not been written in the second memory during the power failure processing.

6. The storage control device according to claim 1, wherein in a case where the processor detects power recovery of the storage control device, the processor acquires the first information and the second information from the second memory and creates analysis information for analyzing the abnormality based on the first information and the second information.

7. A non-transitory, computer-readable recording medium having stored therein a program for causing a computer to execute a process of controlling a storage device, the process comprising:
    executing power failure processing that detects a power failure in a volatile first storage configured to store backup target data and writes the backup target data in a non-volatile second storage, the backup target data including first information on control of the storage device;
    executing abnormality processing that detects an abnormality other than the power failure, acquires second information on a state of hardware at time of detection of the abnormality, and writes the first information and the second information in the second storage; and
    upon detecting the abnormality during execution of the power failure, executing power failure suspension backup processing that suspends the power failure processing, acquires the second information, and writes backup data, the backup data being the backup target data that has not been written to the second memory during the power failure processing, and the second information in the second storage.

8. A storage control device comprising:
    a volatile first memory configured to store backup target data including first control information of a storage device;
    a non-volatile second memory; and
    a processor coupled to the volatile first memory and the non-volatile second memory, the processor configured to execute a process including:
        when a power failure of the volatile first memory occurs, detecting the power failure; and
            writing the backup target data in the non-volatile second memory;
        when an abnormality of the volatile first memory occurs,
            detecting the abnormality;
            acquiring second information including a hardware state at a time when the abnormality is detected; and
            writing the first information and the second information in the non-volatile second memory;
        when an abnormality occurs during the writing the backup target data,
            suspending the writing the backup target data;
            acquiring the second information; and
            writing backup data and the second information in the non-volatile second memory, the backup data being the backup target data that has not been written to the non-volatile second memory.

9. A method of controlling a storage control device, the method comprising:
    when a power failure of a volatile first storage occurs,
        detecting the power failure; and
        writing backup target data in a non-volatile second storage;
    when an abnormality of the volatile first storage occurs,
        detecting the abnormality;
        acquiring second information including a hardware state at a time when the abnormality is detected; and
        writing the first information and the second information in the non-volatile second storage;
    when an abnormality occurs during the writing the backup target data,
        suspending the writing the backup target data;
        acquiring the second information; and
        writing backup data and the second information in the non-volatile second storage, the backup data being the backup target data that has not been written to the non-volatile second storage.

* * * * *